(12) United States Patent
McVey

(10) Patent No.: US 6,523,656 B2
(45) Date of Patent: Feb. 25, 2003

(54) ROTATION TRANSFER DEVICE

(76) Inventor: Charles F. McVey, 661 Barren Rd., Oxford, PA (US) 19363

( * ) Notice: Subject to any disclaimer, the term of this patent is extended or adjusted under 35 U.S.C. 154(b) by 0 days.

(21) Appl. No.: 09/798,269

(22) Filed: Mar. 2, 2001

(65) Prior Publication Data

US 2002/0121419 A1 Sep. 5, 2002

(51) Int. Cl.$^7$ ............................................. F16D 41/06
(52) U.S. Cl. ........................... 192/38; 192/41 R; 192/44
(58) Field of Search ........................... 192/37, 38, 41 R, 192/43, 44, 45

(56) References Cited

U.S. PATENT DOCUMENTS

| | | | | |
|---|---|---|---|---|
| 2,803,145 A | * | 8/1957 | Fisher | 192/38 |
| 3,505,888 A | * | 4/1970 | Denkowski | 192/38 |
| 3,610,379 A | * | 10/1971 | Courtenay | 192/36 |
| 4,204,589 A | * | 5/1980 | Loker et al. | 192/27 |
| 6,120,407 A | | 9/2000 | Mimura | |
| 6,125,961 A | | 10/2000 | Matsufuji | |
| 6,132,332 A | | 10/2000 | Yasui | |
| 6,135,229 A | | 10/2000 | Arimatsu | |
| 6,146,304 A | | 11/2000 | Bendtsen | |
| 6,244,531 B1 | * | 6/2001 | Hori et al. | 192/38 |

* cited by examiner

*Primary Examiner*—Saul Rodriguez
(74) *Attorney, Agent, or Firm*—Glasgow Law Firm, PLLC

(57) ABSTRACT

A rotation transfer device comprising a first rotating element, a second rotating element, and a rotation coupling mechanism wherein the rotation transfer device transfers the rotational force from the first rotation element to the second rotation element and also allows free and independent rotational precession of the second rotating element with respect to the first rotating element. Thus, the device allows for bi-directional transfer of rotational power from the power gear to the driven gear, and allows free and independent rotational precession of the driven gear with respect to the power gear. Therefore, the device can be utilized in a variety of applications, most notably, the device can be used to provide a differential function to vehicles. The device can also be used for non-vehicular applications where unidirectional or bi-directional rotation transfer and slip or freewheeling are required.

26 Claims, 3 Drawing Sheets

ROTATION TRANSFER DEVICE

BACKGROUND OF THE INVENTION

(1) Field of the Invention

The present invention relates generally to a bi-directional rotation transfer device that allows free and independent precession of the dependent rotating element and, more particularly, to a locomotion differential rotation assembly for full-time, full-power, all-wheel drive.

(2) Description of the Prior Art

A locomotion differential is a gear assembly connectable between the traction wheels of a vehicle for permitting different wheels to turn at different speeds relative to one another at the same time. This ability to turn independently is especially important when going around a corner or on uneven terrain since one wheel may have to turn at a different rate than another. For example, when going a corner the inside wheels turn more slowly than the outside wheels. If both wheels were required to turn at the same rate, the vehicle would not move smoothly through turns due to the fact that the wheels would tend to bounce or scrub the traction surface in order to maintain their rate of rotation. Thus, the wheels would periodically loose traction with the surface. Such a vehicle would be dangerous at high speeds, as centrifugal forces acting on the vehicle in the turn would cause it to move sideways in the turn whenever the wheels lost traction with the surface. Additionally, four-wheel drive or all-wheel drive vehicles require a differential between the front and rear axle for similar reasons. A device that would allow freewheeling, or the unhindered super-rotation in the direction of locomotion, would be desirable for such situations, in that the rotation of such a wheel would not be restrained and cause the aforementioned problems.

Various types of differentials also exist to improve traction under slippery conditions. These differentials work by basically slowing or stopping the rotation of the wheel that is slipping. For example, a locking differential reacts when one wheel or axle starts slipping by firmly locking up the gears to prevent that slippage. A limited slip differential limits the speed and torque differences between two wheels on an axle, or between front and rear axles in the case of 4-wheel drive/all-wheel drive, but does not completely lock-up a wheel or semi-axle. By allowing limited slip, the differential ensures that some power is always applied to each of the wheels, even when one is on a slippery surface.

Thus, a differential has to both allow the wheels or axles to rotate independently on one another to prevent loss of traction in a turn, but must also prevent excess slippage to prevent loss of traction under poor traction conditions. Such a device, therefore, has to perform two opposing functions: 1) allow increased differential rotation between wheels or axles, but 2) prevent excessive differential rotation between the same.

Typically, prior art differentials commonly employ complicated mechanical devices to transfer power. Additionally, these differentials usually transfer power to only 1 pair of semi-axles at a time. Thus, a multi-axle vehicle would require several of these differentials: first, it would require a differential to transfer the power between the axles, then, a differential to transfer power between semi-axles. Additionally, these prior art differentials are attached or in close proximity to the transmission, making them difficult to replace and maintain. Frequently, the transmission and/or differential cannot be replaced singularly. Thus, prior art differentials are complex, expensive, and difficult to maintain and replace.

Thus, there remains a need for a differential that can function effectively and not be expensive to manufacture and/or maintain.

SUMMARY OF THE INVENTION

The present invention is directed to a rotation transfer device that allows bi-directional transfer of rotation and bi-directional freewheeling for at least one rotating element coupled therewith by the rotation transfer device.

Also, the present invention is directed to a rotation transfer device including a first rotating element, a second rotating element, and a rotation coupling mechanism that provide bi-directional transfer of rotation from the first rotating element to the second rotating element through the rotation coupling mechanism and bi-directional freewheeling of the second rotating element with respect to the first rotating element through the rotation coupling mechanism.

The present invention is further directed to a rotation transfer device for supplying differential function to a vehicle having multiple wheels and at least one axle to provide bi-directional transfer of rotation and bi-directional freewheeling to vehicular wheels.

The present invention is further directed to a rotation transfer device for supplying differential function to a vehicle having multiple wheels and at least one axle to provide bi-directional transfer of rotation and bi-directional freewheeling within non-vehicular machines.

Accordingly, one aspect of the present invention is to provide a rotation transfer device that allows bi-directional transfer of rotation and bi-directional freewheeling.

Another aspect of the present invention is to provide a rotation transfer device that allows bi-directional transfer of rotation and bi-directional freewheeling for at least one rotating element coupled therewith by the rotation transfer device, including a first rotating element, a second rotating element, and a rotation coupling mechanism that provide bi-directional transfer of rotation from the first rotating element to the second rotating element through the rotation coupling mechanism and bi-directional freewheeling of the second rotating element with respect to the first rotating element through the rotation-coupling mechanism.

Still another aspect of the present invention is to provide a differential system for a vehicle, wherein the differential system includes at least one rotation transfer device having a first rotating element, a second rotating element, and a rotation coupling mechanism, wherein bi-directional transfer of rotation from the first rotating element to the second rotating element is accomplished through the rotation coupling mechanism and bi-directional freewheeling of the second rotating element with respect to the first rotating element is accomplished through the rotation coupling mechanism.

Still another aspect of the present invention is to provide a differential system within a non-vehicular machine wherein the differential system includes at least one rotation transfer device having a first rotating element, a second rotating element, and a rotation coupling mechanism, wherein bi-directional transfer of rotation from the first rotating element to the second rotating element is accomplished through the rotation coupling mechanism and bi-directional freewheeling of the second rotating element with respect to the first rotating element is accomplished through the rotation coupling mechanism.

These and other aspects of the present invention will become apparent to those skilled in the art after a reading of the following description of the preferred embodiment when considered with the drawings.

DETAILED DESCRIPTION OF THE PREFERRED EMBODIMENTS

Figure 1:
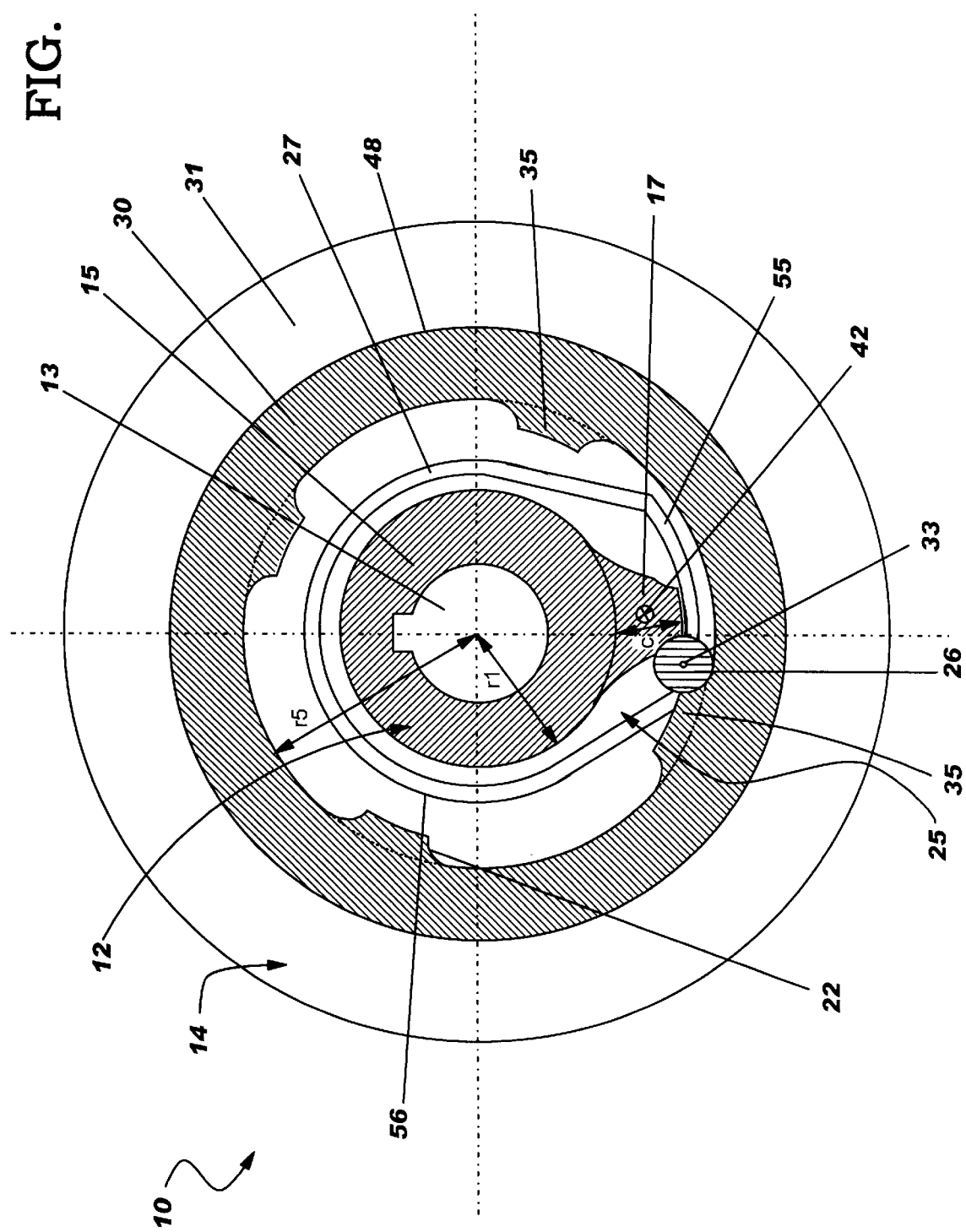
FIG. 1 is a side view of a rotation transfer device constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto.

As shown in FIG. 1, the rotation transfer device, generally referenced as 10, includes a first rotating element 12, a second rotating element 14, and a rotation coupling mechanism 25. The first rotating element includes a power axle 13 and a power gear 15. The second rotating element includes a clover gear 30. The rotation coupling mechanism includes a roller 26 and race housings 40,41 shown in FIG. 2 with roller races 27 incorporated. The race housings 40,41 are two spaced-apart, parallel race housing plates positioned on opposite sides of the first and second rotating elements with the roller races facing the interior of the rotation transfer device and maintained proximal to the rotation transfer device by the housing and the first rotation element fastener mechanism. This fastener mechanism can be any mechanism that holds the race housing plates in contact with the first rotation element, e.g., threaded bolt and nut, clip, and the like. In the preferred embodiment, the housing and the first rotation element fastener mechanism is composed of two plates 43,44, held in contact by a threaded nut 45 threaded onto the power axle 13 which, in combination with a protruding lip 46 on the axle on the opposite side of the rotation transfer device compresses together the race housing plates 40,41 and consequently the entire rotation transfer device. Other mechanisms are possible, and this mechanism is provided as an example, and not a limitation.

Figure 2:
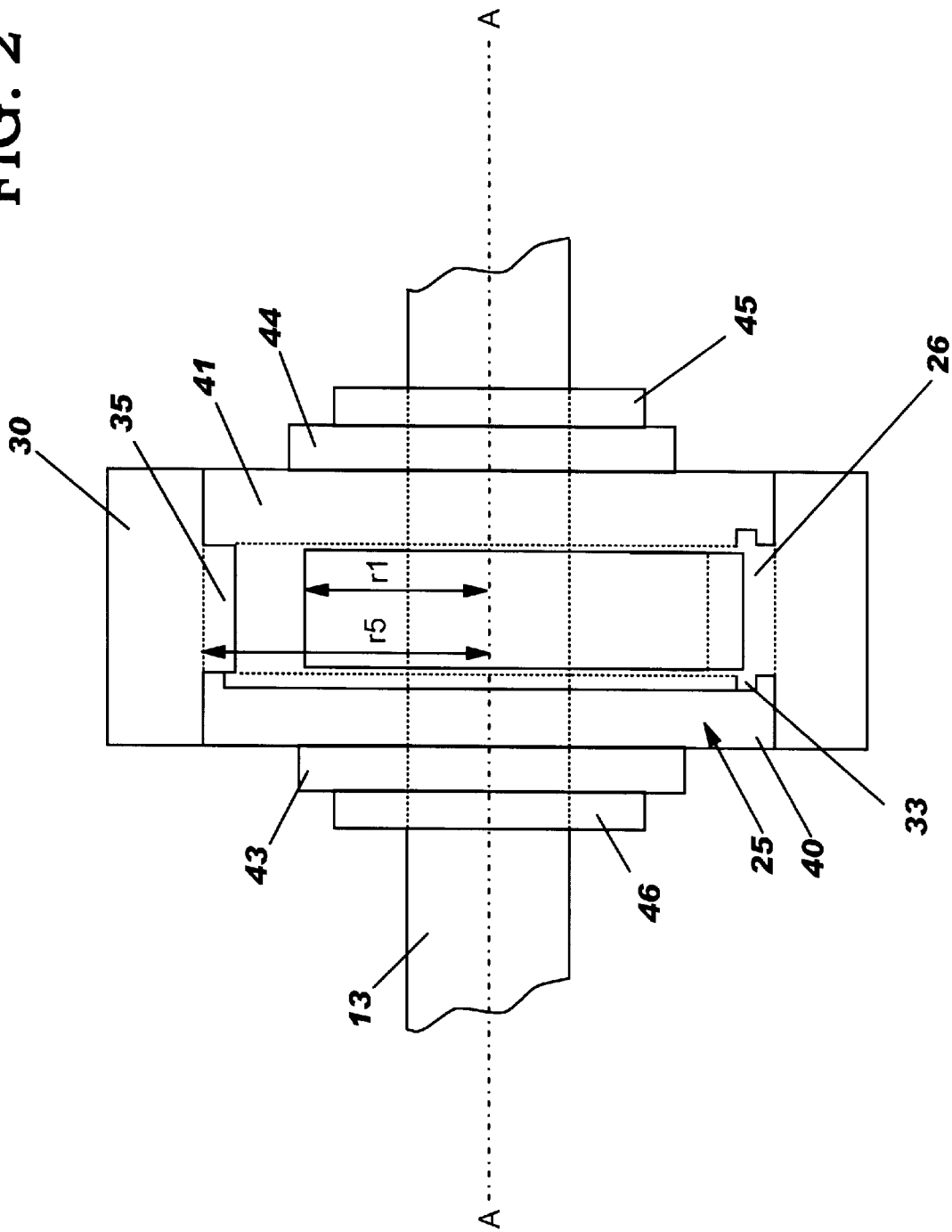
FIG. 2 is an edge view of an alternative embodiment of the present invention.

The power axle 13 extends through the race housings 40,41 and the power gear 15 and maintains these components in concentric alignment along the axis AA, as shown in FIGS. 1 and 2. The zone of contact between the power axle and power gear is configured and constructed such that the power gear does not slip or freewheel around the power axle when the power axle is rotated. The race housings 40,41 and clover gear 35 are maintained in concentric alignment about axis AA by the housing retaining mechanism, which in the preferred embodiment is a protruding lip 48 incorporated into the second rotating element. The race housings contact the clover gear in two modes; laterally and edgewise. The lateral contact prevents excessive movement of the assembly along the axis AA, whereas the edge-wise contact prevents excessive eccentric movement around the axis AA. Thus, the clearance between the race housings and the clover gear is such that the race housings can rotate freely but not so loose as to cause excessive axial or eccentric movement of the race housings. The clearances are selected based on the application. In general, a tight fit onto the clover and power gears is required. The race housings do not contact any other part of the unit other than where they are mounted, and thus there is no other friction or interference with rotation or the roller. This prevents excessive wear and accumulation of dirt or other erosive material inside the device. Additionally, bearings can be installed between the AA axle and the race housings such that the friction between these components is reduced.

Consideration must be taken of the weight to be supported by the rotation transfer device, and thus, the race housings. For heavy loads, bearings can be incorporated into the clover gear housing to reduce the friction between the race housings and the clover gear housing. Additionally, the thickness of the race housings can be increased in order to transfer the weight load over a larger area, and thus decrease the pressure on the housing edge and clover gear housing, reduce friction on these components, and thus prevent wear. For applications where there will be considerable side pressure on the rotation transfer device, for example due to turning in loose terrain such as a tractor in a plowed field, thrust bearings instead of ball bearings may be used on the front turning wheels.

Figure 3:
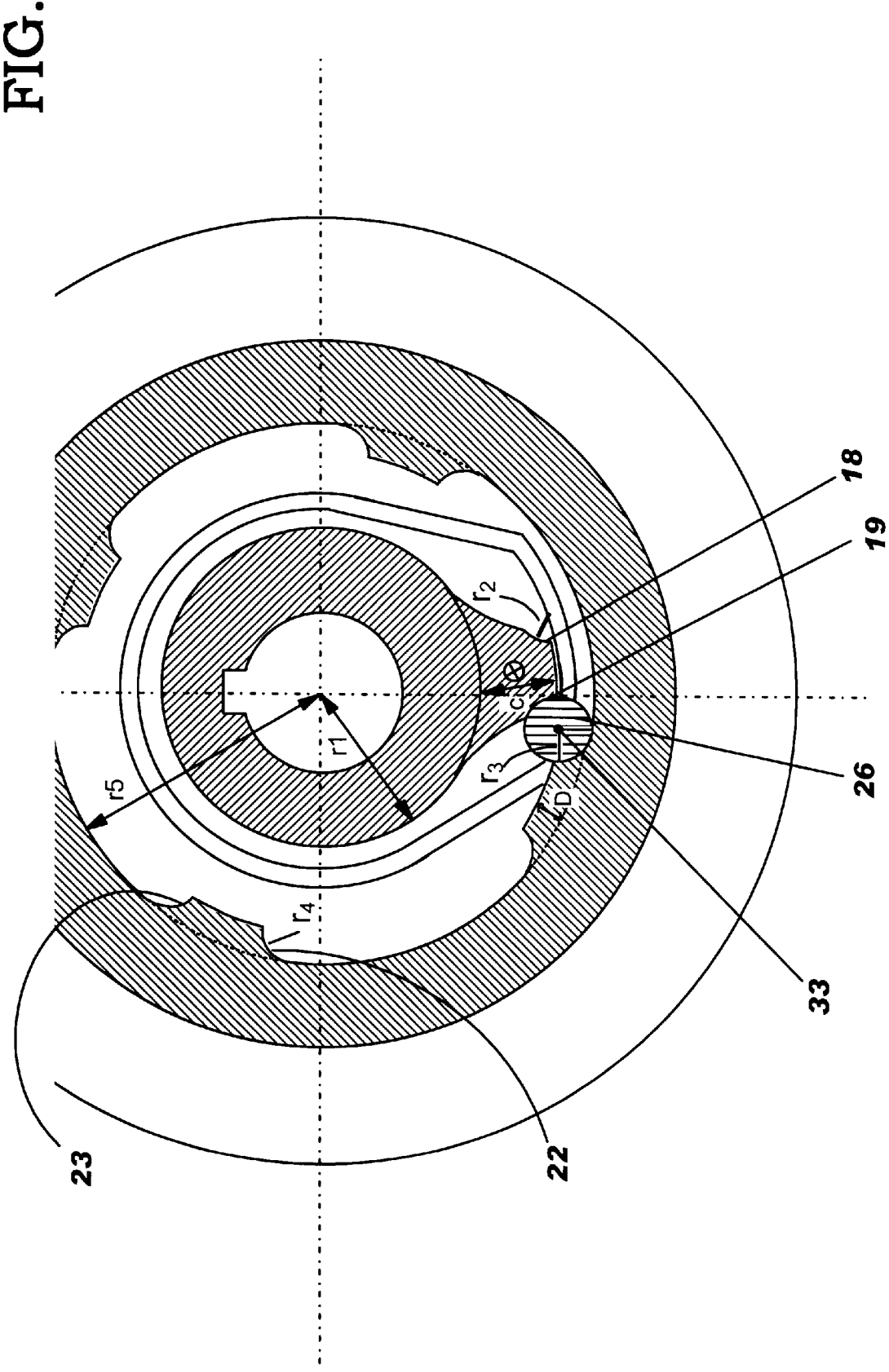
FIG. 3 is a close-up view of a section of FIG. 1.

The clover gear and power gear are thus maintained in concentric alignment about axis AA by the race housings 40,41. Thus, the power gear 15 and clover gear 30 rotate concentrically about axis AA. The power gear 15 is designed such that at least one power tooth 17 extends a distance C beyond the radius of the power gear $r_1$. The power tooth and power gear may be formed of a single piece or of multiple components. The power tooth is designed to maximize the contact area between itself and the roller, thus spreading the impact forces experienced when the two object contact over a larger surface area, preventing damage to both components and extending the life of the device. Thus, as shown in FIG. 3, the contacting edges 18,19 of the power tooth 17 are shaped such that they incorporates a lateral curvature described by a semicircle of radius $r_2$ that approximates the external curvature or cross-sectional aspect of the roller 26 described by a circle with a radius $r_3$. This lateral curvature defines a distance F, shown in FIG. 3, which is the distance along the power tooth from the start of the semicircle to the end of the power tooth. In a preferred embodiment, the lateral curvature of the recess of the power tooth matches the curvature of the rotation coupling component, or $r_2$ equals $r_3$. In the specific example shown in FIG. 3, $r_2$ and $r_3$ equal approximately 6.35 mm. Preferably, the power tooth has two contact sections facing opposite directions for moving the roller into contact alternatively with the at least one clover tooth thereby providing bi-directional rotation transfer of the device. In a preferred embodiment, the roller is a roller sheet in the form of a cylinder with cylindrical guides 33 extending from each end. In the preferred embodiment, the width of the roller is approximately the diameter of the roller; however, in alternative embodiments the roller width may exceed the roller diameter, and vice versa. The roller width in general should not exceed the roller diameter by more than two-fold, because the roller will have a tendency to tilt and jam itself in the race and housing.

The clover gear 30 is a cylindrical ring of internal radius $r_5$ that includes at least one clover tooth 35 extending distance D towards the center of the gear. As shown in FIG. 3, the engaging edges 22,23 of the clover tooth 35 are designed to maximize the contact area between themselves and the roller, thus spreading the impact forces experienced when the two object contact, over a larger surface area, preventing damage to both components and extending the life of the device. Thus, the contacting areas 22,23 of the at least one clover tooth 35 are shaped such that their lateral curvature, which describes a semicircle of radius $r_4$, is similar to the external curvature or cross-sectional aspect of the roller 26 described by a circle with a radius $r_3$. In a preferred embodiment, the curvature of the engaging edges of the clover tooth match the external curvature of the roller, or $r_4$ equals $r_3$. In the specific example shown in FIG. 1, $r_4$ equals approximately 6.35 mm. The housing includes two parallel, spaced-apart planes of circular cross-section, each incorporating a roller track or race or race track 27. The roller's 26 movements are guided through the interaction of these races 27 and the roller 26. In the case of a cylindrical roller sheet, cylindrical guides 33 extend from the main body of the roller sheet into the races. In the specific example shown in FIG. 3, the roller is a cylindrical roller sheet with cylindrical radius $r_3$ equal to approximately 6.35 mm. The race includes a foot section 55 in the proximity of the power tooth and a head section 56 in the areas distant from the power tooth. The foot section allows the roller to contact both the clover tooth and the power tooth when in the proximity of the power tooth. In the area distant from the power tooth, the race guides the roller away from the clover tooth, preventing contact between the clover tooth and the power tooth. The housing race 27 and power tooth 17 are maintained in alignment by the housing and the power tooth alignment fastener 42, which can be a screw, bolt, rivet, or similar fastener. The width of the power gear establishes the distance between the two race housings, which then capture and hold the roller in the races.

The dimensions of the power gear and clover gear are such that the power gear can rotate inside the clover gear without the power tooth contacting any part of the clover gear, including the clover teeth. Thus, $(r_5-D)$ is greater than $(r_1+C)$. However, the clearance between the power tooth and the clover tooth is sufficiently small such that when the curvatures incorporated in the power tooth and the clover tooth are properly aligned they form a discontinuous semicircle with a curvature that is similar to the external curvature of the roller. In the preferred embodiment, the curvature of the semicircle matches the external curvature of the roller and the length F and D of the power tooth and clover tooth, respectively, are less than ½ the diameter of the roller sheet. In the specific example shown in FIG. 3, the roller diameter is approximately 12.7 mm, and the lengths F and D are each approximately 6.35 mm less approximately 0.127 mm, equal to approximately 6.22 mm, to allow clearance of the teeth. All components of the rotation transfer device can be manufactured from a variety of materials, such as metals, plastics, and/or composites.

When the device is positioned such that the power gear axis AA is not parallel to the gravitational field, the roller can move within the race towards the gravitational field. When the power gear is rotated, the roller can continue to move towards the gravitational field, moving through the race that is turning since the housing is turning with the power gear. Eventually, the roller nears the power tooth, and the race in the vicinity of the power tooth allows the roller to move more toward the periphery of the housing and contact the power tooth at the recess. The power tooth now continues to rotate and compels/forces/catches/guides/captures/directs the roller into contact with the next clover tooth at the engaging edge. Upon contacting the clover tooth, the roller now transfers force from the power gear to the clover gear and any device attached to the clover gear, such as a wheel.

Should the rotation of the clover gear start to exceed the rotation of the power gear, the clover gear will be allowed to freely precede the power gear's rotation as it can freely disengage from the roller. The roller is then once again free to move within the race. When the power gear starts rotating faster than the roller and clover gear, it once again pushes the roller back into contact with the clover gear. The same action can occur in either rotational sense if the race is a complete circuit, as shown in FIG. 1. Thus, the device allows for bi-directional transfer of rotational power from the power gear to the driven gear, and allows free and independent rotational precession of the driven gear with respect to the power gear. If the race terminates in the area that prevents the roller from contacting the clover tooth and does not form a complete circuit, then a unidirectional rotation transfer device is formed.

The benefits of the invention include both increased performance and economics. For example, in a vehicle, performance benefits include the fact that no single wheel can slip under power and thus rotate faster than the slowest rotating wheel but each wheel will only rotate at the speed of the slowest rotating wheel. Thus, the rotation transfer device will behave as a limited slip differential under slippery conditions. Also, all wheels can rotate faster than their power gear freely and without limitation, also known as freewheeling. This freewheeling rotation is not hindered in any way by gears or other frictional devices. Additionally, the freewheeling rotation is instantaneous and does not require reaction by any device for activation. Thus, the freewheeling rotation property is inherent in the design of the device and is not susceptible to the failure of any controlling mechanism or device. Economic benefits include the fact that the invention is very simple, composed of only three moving parts—the first rotating element, the roller, and the second rotating element—and of only seven parts in total. Thus, the invention is relatively inexpensive to manufacture. Also, because the invention is installed at the wheel hub, and not attached to the transmission, it is relatively easy to service and replace compared to differentials that attach directly to or are incorporated in the transmission. Additionally, because the transmission no longer needs to incorporate the differential, the transmission can be made much lighter and simpler. Also, substitution of the transmission does not require substitution or removal of the differential, thus reducing costs. Finally, because the rotation transfer device can be incorporated into the wheel hub, the differential no longer requires space in the vicinity of the transmission, thus freeing that space for other purposes.

Because the rotation transfer device can be incorporated into the wheel hub, this property allows for multiple wheels to be mounted on the same axle. This configuration would eliminate the scrubbing action of multiple wheels. Additionally, this property would allow for multiple power axles to be mounted in series to a transmission without the need for a complex differential to distribute power appropriately to the multiple axles. In fact, a vehicle with three or more axles, each axle containing at least one wheel, can be relatively easily designed and constructed. Examples, but not limitations of such applications, include golf carts and fork lifts. Additionally, such a configuration can be used to replace tracked vehicles, potentially at lower cost, because the multi-axle vehicle will distribute the tractor force over a greater surface area, similar to a tracked vehicle. However, in contrast to most tracked vehicles, the vehicle can be driven on pavement, since the vehicle will not "scrub" the pavement and thereby ruin it as a tracked vehicle would.

Certain modifications and improvements will occur to those skilled in the art upon a reading of the foregoing description. By way of example, a housing may be positioned around the clover gear. The clover gear and clover gear housing are constructed such that the clover gear is not free to rotate inside the clover gear housing, but rather such that their relative positions remain fixed. Also, referring again to FIG. 1, the race housing retaining lip 48 may be formed at the interface of the clover gear 30 and the clover gear housing 31 by the extension of the clover gear housing 31 beyond the width of the clover gear. The clover gear housing transfers force from the power gear to the clover gear and any device attached to the clover gear or the clover gear housing, such as a wheel. Also, a braking mechanism may be incorporated into the housing. For this reason, the clover gear housing can be designed of a reduced size such that a brake assembly and wheel can be mounted to it. In the preferred embodiment, the braking assembly is a disc brake assembly. Conventional brake drum assemblies that span across the diameter of the drum would interfere with the rotation transfer device. Current automobiles utilize disc-brakes mechanisms on the front wheels and either disc brakes or drum brakes on the rear wheels. The automobiles that use disc brakes on both sets of wheels would be easily compatible with the hub mounted rotation transfer devices. In an alternate preferred embodiment of the present invention, the rotation transfer device is used at the hub in the front wheels of a vehicle and at the axle housing for the rear wheels. Additionally, the vehicle differential system according to the present invention is also applicable to a single axle and/or a semi-axle such that at least one rotation transfer device is used to connect at least two vehicular wheels wherein each wheel has its own respective rotation transfer device. More preferably, two vehicular wheels sharing a common single axle and/or semi-axle are considered applications wherein each wheel has its own respective rotation transfer device since in prior art dual-wheels on a semi-axle are known to have slippage problems.

All modifications and improvements have been deleted herein for the sake of conciseness and readability but are properly within the scope of the following claims.

I claim:

1. A rotation transfer device for providing transfer of rotation and freewheeling, comprising a first rotating element, a second rotating element, a rotation coupling mechanism, and a housing, wherein:

the first and second rotating elements are pivotally connected concentrically, and the first rotating element includes:
   a power axle that includes a power gear that includes at least one power tooth; and the second rotating element includes:
   a clover gear having at least one clover tooth and a housing retaining mechanism; and the rotation coupling mechanism includes:
   at least one roller and the housing having two spaced-apart, parallel race housing plates, wherein at least one plate has a roller race;

and wherein the two spaced-apart, parallel race housing plates are positioned on opposite sides of the first and second rotating elements with the roller race facing the interior of the rotation transfer device and maintained proximal to the rotation transfer device by the housing and a first rotation element fastener mechanism, and the first and second rotating element are maintained in concentric alignment by the power axle of the first rotating element that extends through the race housing plates and power gear and by the race housing plates that are maintained in concentric alignment with the clover gear by the housing retaining mechanism, and the housing plate roller races and the at least one power tooth are maintained in alignment by the housing and the power tooth alignment fasteners;

and wherein when the first rotating element is rotated, the at least one roller can move towards the at least one power tooth guided by the roller races, which allow the at least one roller to move more towards a periphery of the housing and contact the at least one power tooth, which then pushes the at least one roller into contact with the at least one clover tooth, thus coupling the at least one power tooth and the at least one clover tooth, thereby transferring the rotational force from the first rotation element to the second rotation element and thereby also allowing free and independent rotational precession of the second rotating element with respect to the first rotating element.

2. The rotation transfer device according to claim 1, wherein the power tooth has two contact sections facing opposite directions for moving the roller into contact alternatively with the at least one clover tooth thereby providing bi-directional rotation transfer.

3. The rotation transfer device according to claim 1, wherein the at least one power tooth and the at least one clover tooth are similarly shaped to maximize a contact area between them and the at least one roller in order to spread impact forces over a large surface area and prevent damage to the teeth and roller, thereby extending the life of the rotation transfer device.

4. The rotation transfer device according to claim 3, wherein the lateral aspect of the power tooth contact area is describe by a semicircle with a radius $r_2$ and the cross-sectional aspect of the roller is describe by a circle with a radius $r_3$, and wherein $r_2$ equals $r_3$.

5. The rotation transfer device of claim 4, wherein $r_2$ equals approximately 6.35 mm.

6. The rotation transfer device of claim 4, wherein $r_3$ equals approximately 6.35 mm.

7. The rotation transfer device according to claim 1, wherein the power gear has one power tooth.

8. The rotation transfer device according to claim 1, wherein the housing retaining mechanism is a lip protruding from the clover gear.

9. The rotation transfer device according to claim 1, wherein the number of clover teeth is four.

10. The rotation transfer device according to claim 1, wherein the lateral aspect of the clover tooth contact area is describe by a semicircle with a radius $r_4$ and the cross-sectional aspect of the roller is describe by a circle with a radius $r_3$, and wherein $r_4$ equals $r_3$.

11. The rotation transfer device according to claim 10, wherein $r_4$ equals approximately 6.35 mm.

12. The rotation transfer device according to claim 1, wherein the race housing plates have a circular cross-section.

13. The rotation transfer device according to claim 1, wherein the rotation transfer device elements are made of a durable material.

14. The rotation transfer device according to claim 13, wherein the durable elements are selected from the group consisting of plastics, metals, composites, and combinations thereof.

15. The rotation transfer device according to claim 1, wherein the race includes a head that prevents contact between the at least one roller, the at least one clover tooth, and the at least one power tooth, and a foot region that allows contact between the at least one roller, the at least one clover tooth, and the at least one power tooth.

16. The rotation transfer device according to claim 1, wherein the race forms a complete circuit.

17. The rotation transfer device according to claim 1, wherein the at least one roller has a cylindrical shape.

18. The rotation transfer device according to claim 17, wherein the roller has a diameter of approximately 12.7 mm.

19. The rotation transfer device according to claim 1, wherein the at least one roller is a ball bearing.

20. The rotation transfer device according to claim 1, wherein the at least one roller is gravity-driven.

21. The rotation transfer device according to claim 1, wherein the at least one roller is centrifugal-force driven.

22. The rotation transfer device according to claim 1, wherein the at least one roller is gravity and centrifugal-force driven.

23. A vehicle differential system for providing transfer of rotation and freewheeling, comprising at least one rotation transfer device, the rotation transfer device further including a first rotating element, a second rotating element, a rotation coupling mechanism, and a housing, wherein:

the first and second rotating elements are pivotally connected concentrically, and the first rotating element includes:
a power axle that includes a power gear that includes at least one power tooth; and the second rotating element includes:
a clover gear having at least one clover tooth and a housing retaining mechanism; and the rotation coupling mechanism includes:
at least one roller and the housing having two spaced-apart, parallel race housing plates with roller races;

and wherein the two spaced-apart, parallel race housing plates are positioned on opposite sides of the first and second rotating elements with the roller races facing the interior of the rotation transfer device and maintained proximal to the rotation transfer device by the housing and a first rotation element fastener mechanism, and the first and second rotating element are maintained in concentric alignment by the power axle of the first rotating element that extends through the race housing plates and power gear and by the race housing plates that are maintained in concentric alignment with the clover gear by the housing retaining mechanism, and the housing plate roller races and the at least one power tooth are maintained in alignment by the housing and the power tooth alignment fasteners;

and wherein when the first rotating element is rotated, the at least one roller can move towards the at least one power tooth guided by the roller races, which allow the at least one roller to move more towards a periphery of the housing and contact the at least one power tooth, which then pushes the at least one roller into contact with the at least one clover tooth, thus coupling the at least one power tooth and the at least one clover tooth, thereby transferring the rotational force from the first rotation element to the second rotation element and thereby also allowing free and independent rotational precession of the second rotating element with respect to the first rotating element.

24. The vehicle differential system of claim 23, wherein the at least one rotation transfer device is used to connect at least two vehicular wheels.

25. The vehicle differential system of claim 23, wherein the each rotation transfer device is connected to a respective vehicular wheel.

26. A non-vehicular machine differential system for providing transfer of rotation and freewheeling, comprising at least one rotation transfer device, the rotation transfer device further including a first rotating element, a second rotating element, a rotation coupling mechanism, and a housing, wherein:

the first and second rotating elements are pivotally connected concentrically, and the first rotating element includes:
a power axle that includes a power gear that includes at least one power tooth; and the second rotating element includes:
a clover gear having at least one clover tooth and a housing retaining mechanism; and the rotation coupling mechanism includes:
at least one roller and the housing having two spaced-apart, parallel race housing plates with roller races;

and wherein the two spaced-apart, parallel race housing plates are positioned on opposite sides of the first and second rotating elements with the roller races facing the interior of the rotation transfer device and maintained proximal to the rotation transfer device by the housing and a first rotation element fastener mechanism, and the first and second rotating element are maintained in concentric alignment by the power axle of the first rotating element that extends through the race housing plates and power gear and by the race housing plates that are maintained in concentric alignment with the clover gear by the housing retaining mechanism, and the housing plate roller races and the at least one power tooth are maintained in alignment by the housing and the power tooth alignment fasteners;

and wherein when the first rotating element is rotated, the at least one roller can move towards the at least one power tooth guided by the roller races, which allow the at least one roller to move more towards a periphery of the housing and contact the at least one power tooth, which then pushes the at least one roller into contact with the at least one clover tooth, thus coupling the at least one power tooth and the at least one clover tooth, thereby transferring the rotational force from the first rotation element to the second rotation element and thereby also allowing free and independent rotational precession of the second rotating element with respect to the first rotating element.

* * * * *